United States Patent [19]
Kloss

[11] 3,794,305
[45] Feb. 26, 1974

[54] APERTURED COLUMN TRAY PROVIDED WITH BUBBLE CAPS

[75] Inventor: Hans Joachim Kloss, Hilden, Germany

[73] Assignee: Firma Julius Montz GmbH, Hilden, Germany

[22] Filed: Mar. 13, 1972

[21] Appl. No.: 233,998

[30] Foreign Application Priority Data
Mar. 13, 1971 Germany............................ 2112110

[52] U.S. Cl.............................................. 261/114 A
[51] Int. Cl................................................ B01f 3/04
[58] Field of Search ...... 261/114 A, 114 VT, 114 R

[56] References Cited
UNITED STATES PATENTS
2,176,498  10/1939  Hickman....................... 261/114 R
2,819,049  1/1958  Manning, Jr. et al........... 261/114 A
2,819,050  1/1958  Huggins et al................. 261/114 A
2,893,713  7/1959  Haltmeier....................... 261/114 A Primary Examiner—Tim R. Miles
Attorney, Agent, or Firm—Burgess, Dinklage & Sprung

[57] ABSTRACT

An improvement in a column tray comprising at least one bubble cap disposed over an aperture of a plate, said cap having at least one opening therein, which improvement comprises a marginal edge on said plate adjacent said aperture, which marginal edge is raised from said plate and bent downwardly to define said aperture.

6 Claims, 3 Drawing Figures

APERTURED COLUMN TRAY PROVIDED WITH BUBBLE CAPS

BACKGROUND OF THE INVENTION

1. Field of the Invention

This invention is directed to a column tray having at least one aperture therein over which is disposed a bubble cap. More particularly, this invention is directed to a column tray useful in rectifying columns, such as distillation columns and the like, which tray, due to its construction, has an improved capacity for liquid to be disposed thereover. The principle behind the improved tray decreases the pressure loss of the tray itself, as will appear below.

2. Discussion of the Prior Art

In columns such as distillation columns, the maximum limit to which can be fed vapor that is being passed through such columns, the so-called flood limit, is reached when the liquid condensing in a tray is prevented from draining down to the tray below it. If the flood limit of such a tray is to be raised, the pressure loss of the tray, i.e., the reduction produced by the tray in the pressure of the rising vapor, has to be reduced.

The pressure loss of the tray is determined by the pressure loss sustained by overcoming the liquid standing on the tray, which depends on the static liquid level, and the dynamic pressure loss that is due to the resistance to flow resulting from the shape of the flow path.

Since this dynamic pressure loss in the case of high vapor input essentially determines the total pressure loss for the tray, it is the object of the invention to diminish it in order to achieve greater vapor throughputs.

SUMMARY OF THE INVENTION

Broadly, this invention contemplates an improvement in a column tray comprising at least one bubble cap disposed over an aperture of a plate, said cap having at least one opening therein, which improvement comprises a marginal edge of said plate adjacent said aperture, which marginal edge is raised from said plate and bent downwardly to define said aperture.

In a particularly desirable embodiment of the invention, the raised portion of the marginal edge arcuately joins the downwardly disposed portion of the marginal edge to define an arc of a circle which would have a radius of between 4 and 6 millimeters. Generally speaking, and in a preferred embodiment, the downwardly disposed portion of the marginal edge would form an angle of no greater than 90° with the normal plane of the plate. Thus, the downwardly disposed portion can be generally perpendicular to the normal plane of the plate or it can be bent backwards toward the plate itself, to define an angle of less than 90°, as seen in the embodiment of FIG. 3 below.

DESCRIPTION OF PREFERRED EMBODIMENTS

According to the invention, this object is achieved by the fact that, at the margin of the aperture, the tray is bent downwardly with a radius of curvature of several millimeters. Preferably, the margin of the aperture is first bent upwardly a few millimeters at a low angle, and then is bent essentially perpendicularly downwardly, or in such a manner as to taper inwardly from the bottom to the top. Thus, the downwardly disposed plate portion would form an angle with the normal plane of the plate of not greater than 90°.

In the case of trays having rectangular apertures and bubble caps which are shaped accordingly, the metal plate forming the tray is bent downwardly in the manner described, at the two long edges of the rectangular aperture.

BRIEF DESCRIPTION OF THE DRAWINGS

The drawings illustrate several embodiments of the invention. In the drawings.

DESCRIPTION OF SPECIFIC EMBODIMENTS

Figure 1:
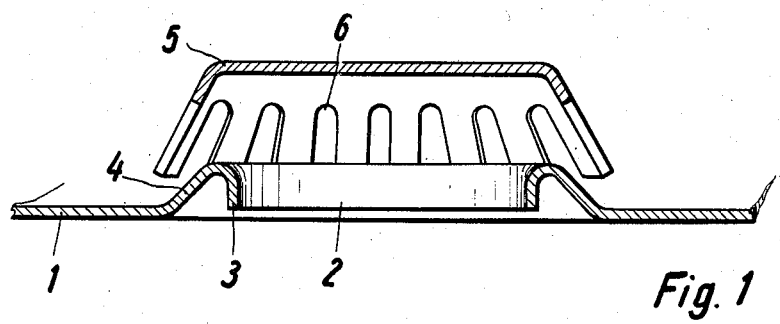
FIG. 1 is a longitudinal cross section through a circular aperture in a column tray constructed in accordance with the invention.

In FIG. 1 the tray consiting of the metal plate 1 has a circular aperture 2 which is defined by the margins 3 of the metal plate 1, which are bent downwardly at right angles.

To form margins 3, first an aperture 2 is punched out of the plate 1. Then the raised portion 4 of the plate 1 adjacent the aperture 2 is bent upwardly at an angle of about 40°, and then is bent downwardly towards the aperture 2 with a radius of curvature $r$ amounting to several millimeters, e.g., 4 to 6 millimeters. Above the aperture 2 there is disposed a bubble cap 5 which does not reach all the way down to the tray and which has elongated notches 6.

Figure 2:
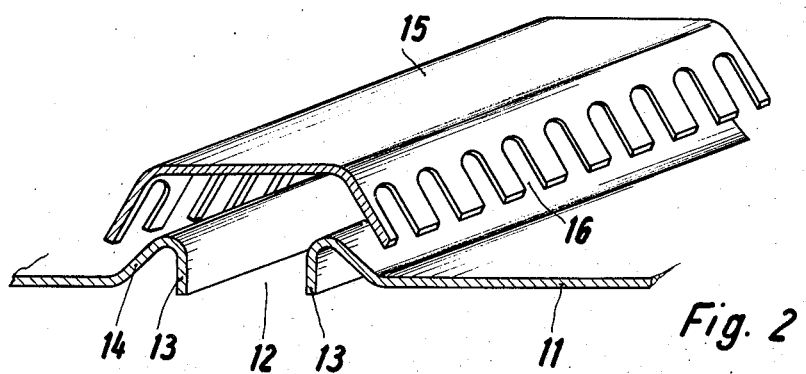
FIG. 2 shows a perspective view in longitudinal cross section of a rectangular aperture in a column tray constructed in accordance with the invention.

The arrangement in FIG. 2 differs from that in FIG. 1 only in that the aperture 12 is rectangular instead of circular.

The two longitudinal margins 13 of the aperture 12 are in like manner bent beyond a slanting surface 14 at a radius of curvature $r$ amounting to several millimeters. The cap 15 corresponds to the cap 5 of FIG. 1.

Figure 3:
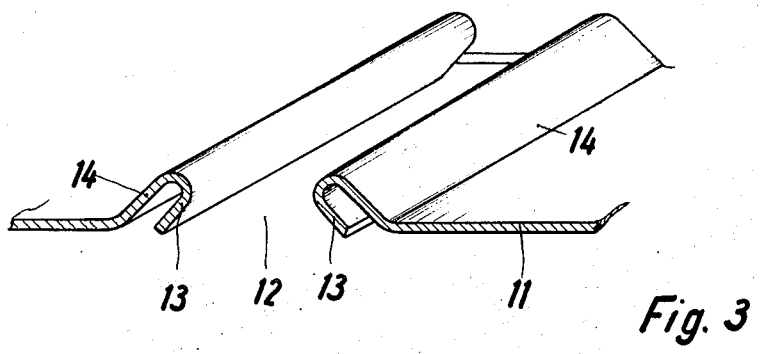
FIG. 3 is also a perspective representation in longitudinal cross section of a rectangular aperture in a column tray in accordance with the invention, in a slightly different form characterized by inwardly directed downwardly disposed flange members.

FIG. 3 differs from the system shown in FIG. 2 only in that the margins 13 defining the aperture 12 taper inwardly instead of being perpendicular. Otherwise, the system is the same as the one in FIG. 2.

From the above discussion it is seen that a relatively simple and inexpensive modification of a column tray provides an increased liquid capacity, which, in turn, affects the flood limit of the tray. More particularly, it is apparent that the pressure loss of the tray itself is materially reduced by this construction, which allows the ascending vapors to pass through the openings of the bubble caps themselves without impingement on a substantial quantity of liquid disposed on the tray. Thus, by altering the shape of the flow path, an improved tray is produced, whereby the pressure low sustained by overcoming the liquid standing on the tray is materially reduced.

What is claimed is:

1. In a column tray comprising at least one bubble cap disposed over an aperture of a plate, said cap having at least one opening therein, the improvement which comprises a marginal edge of said plate adjacent said aperture, which marginal edge is raised from said plate and bent downwardly to define said aperture.

2. An improvement according to claim 1, wherein the raised portion of said marginal edge arcuately joins the downwardly disposed portion of said marginal edge to define an arc of a circle having a radius between 4 and 6 millimeters.

3. An improvement according to claim 1, wherein the upwardly disposed portion of the marginal edge forms an angle of 90° with the normal plane of the plate.

4. An improvement according to claim 1, wherein the downwardly disposed portion of the marginal edge forms an angle of no more than 90° with respect to the normal plane of the plate.

5. An improvement according to claim 4, wherein the downward portion of the marginal edge is perpendicular to the normal plane.

6. An improvement according to claim 4, wherein the bubble cap and the aperture are rectangular.

* * * * *

PO-1050
(5/69)

UNITED STATES PATENT OFFICE
CERTIFICATE OF CORRECTION

Patent No. __3,794,305__    Dated __February 26, 1974__

Inventor(s) __Hans Joachim Kloss__

It is certified that error appears in the above-identified patent and that said Letters Patent are hereby corrected as shown below:

Under Foreign Application Priority Data

"2112110" should read "P 21 12 110.8"

Signed and sealed this 24th day of September 1974.

(SEAL)
Attest:

McCOY M. GIBSON JR.
Attesting Officer

C. MARSHALL DANN
Commissioner of Patents